United States Patent [19]
Condon

[11] Patent Number: 5,844,923
[45] Date of Patent: Dec. 1, 1998

[54] FAST FRAMING OF NUDE ATM BY HEADER ERROR CHECK

[75] Inventor: Joseph Henry Condon, Summit, N.J.

[73] Assignee: AT&T Corp, Middletown, N.J.

[21] Appl. No.: 736,151

[22] Filed: Oct. 24, 1996

[51] Int. Cl.⁶ .............................. H03M 13/00; H04L 7/00
[52] U.S. Cl. .......................................................... 371/47.1
[58] Field of Search ........................... 371/47.1, 42, 37.6, 371/37.07

[56] References Cited

U.S. PATENT DOCUMENTS

| | | | |
|---|---|---|---|
| 5,282,215 | 1/1994 | Hyodo et al. ............................. | 371/42 |
| 5,715,259 | 2/1998 | Lee et al. .................................. | 371/42 |
| 5,771,249 | 6/1998 | Yanagisawa ............................. | 371/47.1 |

*Primary Examiner*—Stephen M. Baker

[57] ABSTRACT

This invention provides a fast framing device that processes a stream of bytes and generates a signal for every byte clock that indicates whether a selected Asychronous Transfer mode cell boundary may be valid. The fast framing device generates a Cyclical Redundancy Code (CRC) corresponding to each byte from a input byte stream. The generated CRC is processed by an XOR tree that produces an output equivalent to processing the CRC code through five cycles of an CRC generator. The result of the XOR tree is XORed with a hexidecimal number "AC" or 0×AC. The result of the XOR tree and the XOR gate is delayed by five cycles and then compared with the CRC generated during the fifth byte clock. The compared results indicate whether the prior five bytes may be a valid ATM cell header.

16 Claims, 12 Drawing Sheets

FIG. 2A

|   | MESSAGE |
|---|---------|
| 7 | 1 0 0 0 0 0 0 0 |
| 6 | 0 1 0 0 0 0 0 0 |
| 5 | 0 0 1 0 0 0 0 0 |
| 4 | 0 0 0 1 0 0 0 0 |
| 3 | 0 0 0 0 1 0 0 0 |
| 2 | 0 0 0 0 0 1 0 0 |
| 1 | 0 0 0 0 0 0 1 0 |
| 0 | 0 0 0 0 0 0 0 1 |
|   | 7 6 5 4 3 2 1 0 |

FIG. 2B

|   | CRC |
|---|-----|
|   | 1 0 0 0 1 0 0 1 |
|   | 1 1 0 0 0 1 1 1 |
|   | 1 1 1 0 0 0 0 0 |
|   | 0 1 1 1 0 0 0 0 |
|   | 0 0 1 1 1 0 0 0 |
|   | 0 0 0 1 1 1 0 0 |
|   | 0 0 0 0 1 1 1 0 |
|   | 0 0 0 0 0 1 1 1 |
|   | 7 6 5 4 3 2 1 0 |

FIG. 3A

|   | 7 - - - - - - 0 |
|---|------------------|
| 7 | 1 1 1 0 0 0 0 0 |
| 6 | 0 1 1 1 0 0 0 0 |
| 5 | 0 0 1 1 1 0 0 0 |
| 4 | 0 0 0 1 1 1 0 0 |
| 3 | 1 0 0 0 1 1 1 0 |
| 2 | 0 1 0 0 0 1 1 1 |
| 1 | 0 1 0 0 0 0 1 1 |
| 0 | 1 1 0 0 0 0 0 1 |

FAST FRAMING OF NUDE ATM BY HEADER ERROR CHECK

1. FIELD OF THE INVENTION

This invention relates to a device for determining transmission frames using cyclical redundancy coding.

2. BACKGROUND OF THE INVENTION

Data transmission over high speed medium such as optical fibers have increased data transmission rates. However, full bandwidth of transmission mediums have not been exploited due to transmission protocol restrictions. As protocol standards are established for new transmission mediums, existing protocols are incorporated into new protocol standards by "wrapping" existing protocols within a new protocol, thus introducing many undesirable inefficiencies.

Asynchronous transfer mode (ATM) is a very flexible protocol but is conventionally wrapped in other protocols such as SONET. Thus, ATM data transmission rates could be increased if the ATM protocol is used directly on a high speed medium. However, standard protocols such as SONET supply byte boundary indications, for example. This service would be lacking if the ATM protocol is used alone or nude. Thus, a method is required to determine byte boundaries of nude ATM transmissions so that data can be reliably transmitted and received. In addition, the ATM protocol define cells and indication of cell boundaries would also be required.

Techniques have been developed to determine nude ATM byte and cell boundaries, however these techniques require excessive processing time which reduces the inherent ATM transmission rates. Thus, a faster method for determining byte and cell boundaries is needed to improve ATM data transmission rates and fully exploit data transmission speeds offered by high speed transmission mediums.

SUMMARY OF THE INVENTION

This invention provides a fast framing device that processes a stream of bytes transmitted by a data transmission medium and generates a signal for every byte clock that indicates whether a selected ATM cell boundary may be valid. The fast framing device generates a cyclical redundancy code (CRC) corresponding to each byte from an input byte stream. The generated CRC is processed by an XOR tree that produces an output equivalent to processing the CRC code through five byte clocks of an CRC generator. The result of the XOR tree is XOR'd with a hexidecimal number "AC" or 0×AC. The result of the XOR tree and the XOR gate is delayed by five cycles and then compared with the CRC generated during every fifth byte clock. The compared results indicates whether the prior five bytes may be a valid ATM cell header.

BRIEF DESCRIPTION OF THE DRAWINGS

The invention is described in detail with reference to the following drawings, wherein like numerals represent like elements.

DETAILED DESCRIPTION OF THE PREFERRED EMBODIMENTS

Figure 1:
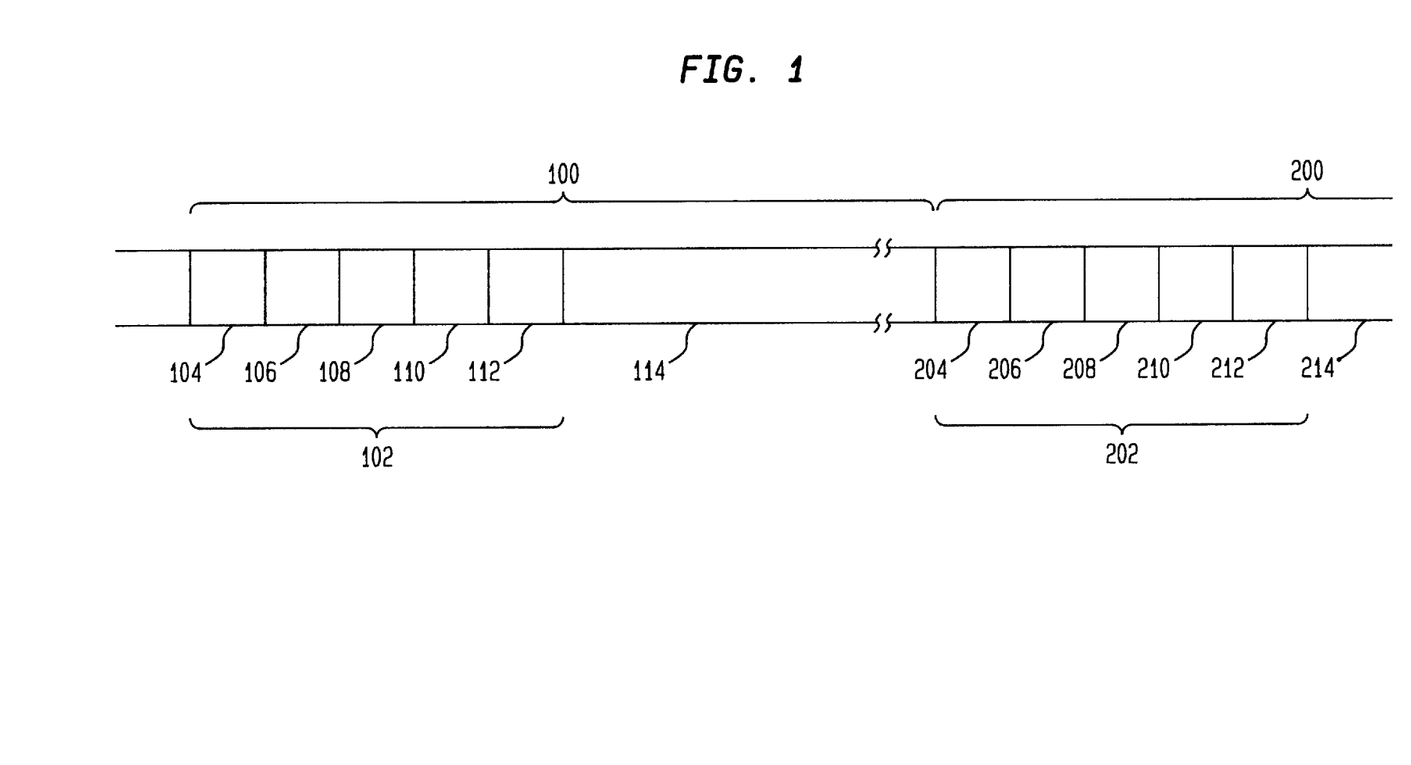
FIG. 1 is a block diagram of an ATM cell.

FIG. 1 is a diagram of an ATM cell. The ATM protocol transmits information in cells where each cell contains 53 bytes of data. The first five bytes of the data form a header and the following 48 bytes of the data are information that is being transmitted and is called "payload". As shown in FIG. 1, the ATM cell 100 includes header 102 and payload 114. The header 102 includes five bytes 104, 106, 108, 110 and 112. Header bytes 104, 106, 108 and 110 contain control information while header byte 112 is a header error check (HEC) that is related to a cyclical redundancy code (CRC) of the first 4 bytes.

FIG. 1 also shows a second cell 200 immediately following cell 100 containing header 202 and payload 214. The header 202 also contains five bytes 204, 206, 208, 210 and 212. The header byte 212 is the HEC for the header 202.

The CRC is generated by polynomial division using XORs. The polynomial specified by the ATM standard is a hexadecimal number 107 or 0×107 which is 100000111 in binary. To generate the CRC for the ATM header, the first 4 bytes of the ATM header are divided by 0×107. The remainder of the polynomial division is the CRC for the ATM header. By convention, a hexadecimal number 0×55 is XOR'd with the generated CRC to form the fifth byte which is the HEC so that if the first four bytes of an ATM header are 0's, resulting in 0's for the CRC, the HEC would be 0×55.

Figure 2A:
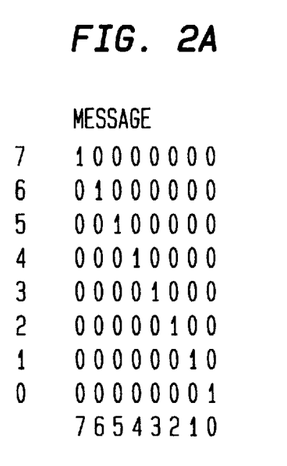
FIGS. 2A and 2B are tables of possible data bytes and corresponding CRC codes.
Figure 2B:
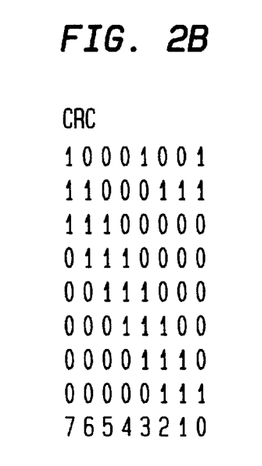

FIG. 2A shows eight bytes of data: byte 7, byte 6, . . . , byte 0 from the first row to the eighth row. FIG. 2B shows corresponding CRCs for each of the data bytes 7–0 shown in FIG. 2A. By empirical observation, the CRC may be related to the data bytes 7–0 as follows: bit 7 of the CRC is a 1 for data bytes 7–5; bit 6 of the CRC is a 1 for data bytes 6–4; and so on.

The above empirical observation is important when combined with a well known theorem that states:
If CRC1 is the CRC of M1; if CRC2 is the CRC of M2; if M1 and M2 are equal length; and if M3 is M1 XOR M2, then CRC3 is the CRC of M3 and CRC3 is equal to CRC1 XOR CRC2.

The above theorem permits the determination of the CRC for any data byte by combining the CRCs of data bytes 7–0, because any data byte may be formed by XORing selected ones of the data bytes 7–0.

Figure 3A:
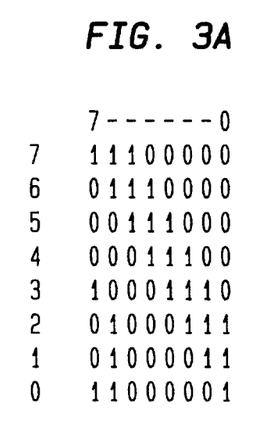
FIG. 3A is the CRC table shown in FIG. 2B transposed.

FIG. 3A shows the table of CRCs shown in FIG. 2B but transposed about the diagonal extending from the top left corner to the bottom right corner. The table in FIG. 3A relates the bit values of a byte of data to a corresponding byte of CRC by applying the above theorem. For any data byte, bit 7 of the CRC is equal to the value of bits 7–5 of the data byte XOR'd together; bit 6 of the CRC is equal to the value of bits 6–4 of the data byte XOR'd together, and so on. Thus, for a data byte '11001011' bit 7 of the CRC 7 is 0 because bit 7 XOR bit 6 XOR bit 5=0; bit 6 of the CRC is 1because bit 6 XOR bit 5 XOR bit 4=1, and so on resulting in '0111111' as the CRC for '11001011'. Thus, a CRC generating circuit may be constructed using an XOR circuit 406 to generate the CRC for any data byte, as shown in FIG. 3B.

Figure 3B:
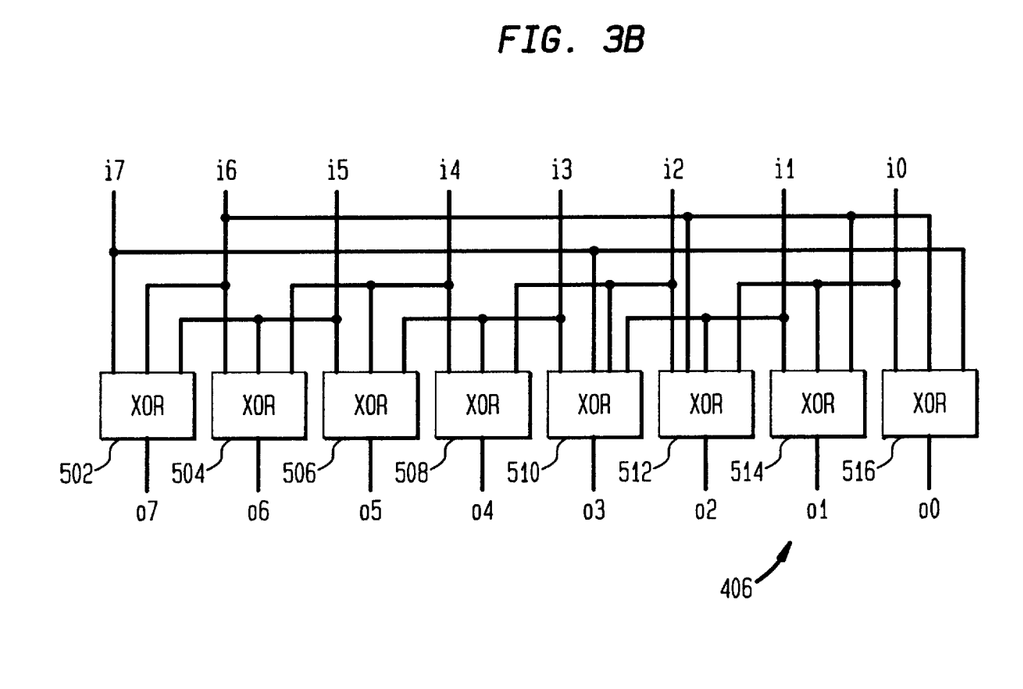
FIG. 3B is a hardware implementation of an XOR tree that implements the table of FIG. 3A.

In FIG. 3B, XOR gate 502 generates bit 7 of the CRC from bits 7–5 indicated by i7–i5 of the data byte. XOR gate 504 generates bit 6 of the CRC from bits 6–4 of the data byte. Similarly, XOR gates 506–514 generate bits 5–0 of the CRC from indicated bits of the data byte.

Figure 4:
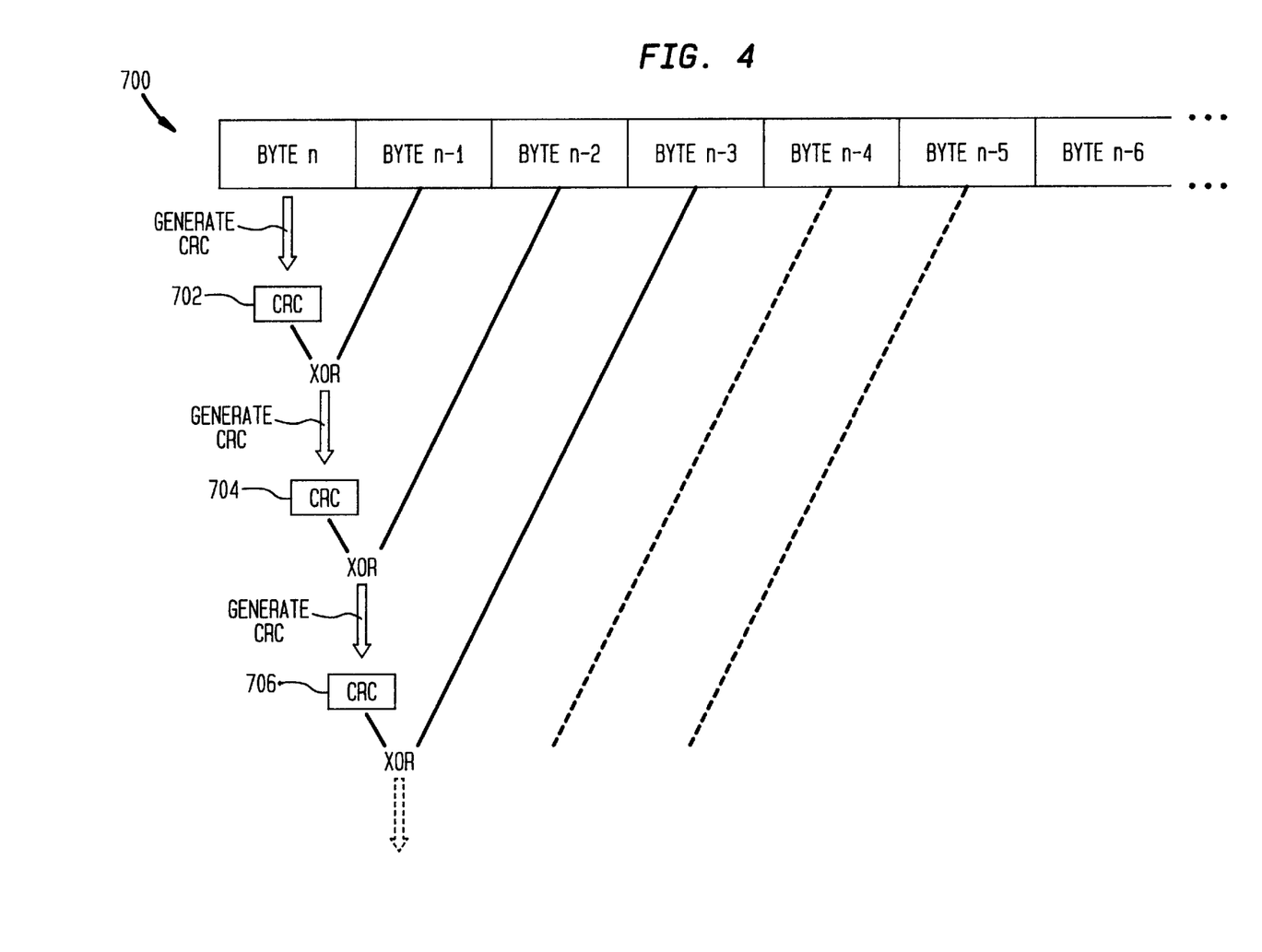
FIG. 4 is a diagram of a method for generating a CRC for multiple byte data in a byte stream.

FIG. 4 shows a further application of the above theorem that generates a CRC for a multiple byte data 700 processing the multiple byte data 700 one byte at a time. The multiple byte data 700 may be treated as an XOR of all the individual bytes in their respective positions with the bit positions of all other bytes set to 0s. If CRC 702 of byte n is generated first by using the circuit shown in FIG. 3B for example, then CRC 702 may be XOR'd with byte n−1 to generate CRC 704 of the data formed by bytes n and n−1. This is possible because a CRC is the remainder of a polynomial divide and is XOR'd with the next byte of the dividend as part of the polynomial divide process. The CRC 704 of bytes n and n−1 is XOR'd with byte n−2 to generate CRC 706 of bytes n, n−1 and n−2. This process is continued until a CRC for all the bytes of the multiple byte data 700 is generated.

The above method for generating the CRC for a multiple byte data is used to determine the HEC in a ATM transmission stream. When nude ATM cells are transmitted on a medium, there is no indication of where a byte or an ATM cell begins. Because the HEC of the ATM header uniquely identifies the header bytes, the HEC's for every possible five byte blocks are generated to determine valid byte and ATM cell boundaries. Thus, the HEC of a five byte block is a predetermined condition which, if satisfied, indicates that the five byte block can be a valid ATM header.

When a selected byte boundary and a five byte block representing a selected ATM cell boundary contains good HEC, the selected byte and ATM cell boundaries may be valid byte and ATM cell boundaries. To increase confidence that the selected byte and cell boundaries are valid, the HEC of a following ATM cell is generated. If the HEC of a preset number of ATM cells are all valid, then the selected byte and ATM cell boundaries is deemed valid and data is extracted based on the determined byte and ATM cell boundaries.

Not all subsequent ATM cells may have valid HEC's because the data transmission may have introduced an error. Thus, if enough ATM cells have valid HEC's, the selected byte and ATM cell boundaries may be deemed valid even if a small number of ATM cells have invalid HEC's.

Figure 5:
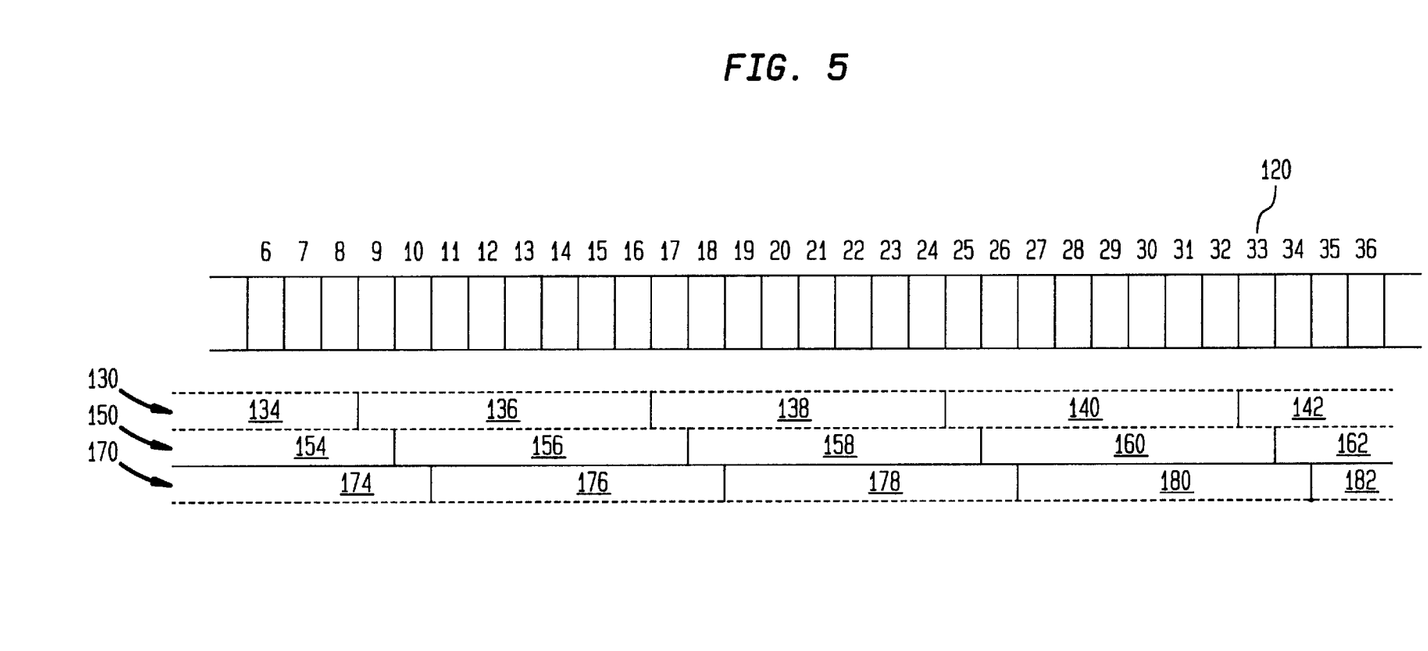
FIG. 5 is a diagram showing possible ATM headers in a stream of bits.

Before a CRC can be generated for a prospective header, the byte boundaries must first be determined so that consecutive bytes may be used to generate the CRC. FIG. 5 shows a continuous stream of bits 120 where each bit is individually numbered as indicated above each bit position. Below the stream of bits 120 are three guesses of possible byte boundaries 130, 150 and 170. For each of the possible byte boundaries, consecutive bytes are used to determine whether an ATM cell boundary is encountered. If a good HEC is obtained for the bytes 134, 136, 138, 140 and 142 for example, then valid byte and ATM cell boundaries may have been discovered. Thus, for guess 130, bytes 134–142 are used to generate a CRC to determine if the byte boundary guess 130 is potentially correct and whether bytes 134–142 form a valid header for an ATM cell. A similar process is also executed for guess 150 having bytes 154, 156, 158, 160 and 162 and for guess 170 having bytes 174, 176, 178, 180 and 182.

Figure 6:
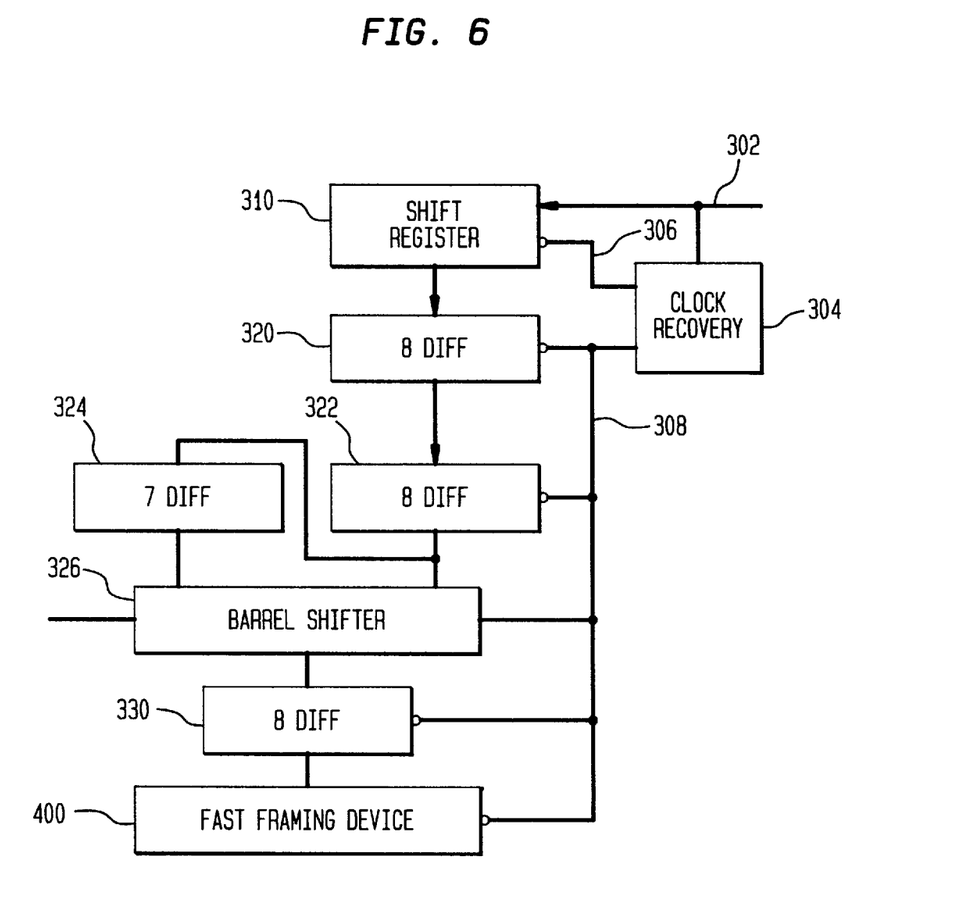
FIG. 6 is a block diagram of a logic circuit that extracts bytes from a stream of bits.

FIG. 6 shows a block diagram of a circuit that inputs the bit stream 120 shown in FIG. 5 and forms potential bytes for a fast framing device 400. The bit stream 120 is input through signal line 302 into a shift register 310. A clock recovery circuit 304 also inputs the bit stream 120 to extract the clock from the bit stream. The extracted clock is input into the shift register 310 through signal line 306 so that the bits may be shifted into the shift register 310. The clock recovery circuit 304 also generates a byte clock by dividing the bit clock by eight and outputs the byte clock through signal line 308 to the byte registers 320, 322, 330, the register 324 and the fast framing device 400. Thus, the stream of bits 120 is divided into eight bit blocks and each of the eight bit blocks is captured by the register 320 and loaded into register 322.

Register 324 saves a right most seven bit block from a prior eight bit block so that all possible byte boundaries including any of the eight bits in register 322 may be obtained. The barrel shifter 326 inputs the fifteen bits from register 324 and 322 and produce any contiguous eight bits to form a byte from the fifteen input bits. The barrel shifter selects the byte based on a control signal from signal line 328. The selected byte is loaded into register 330 for every byte clock on signal line 308.

Figure 7:
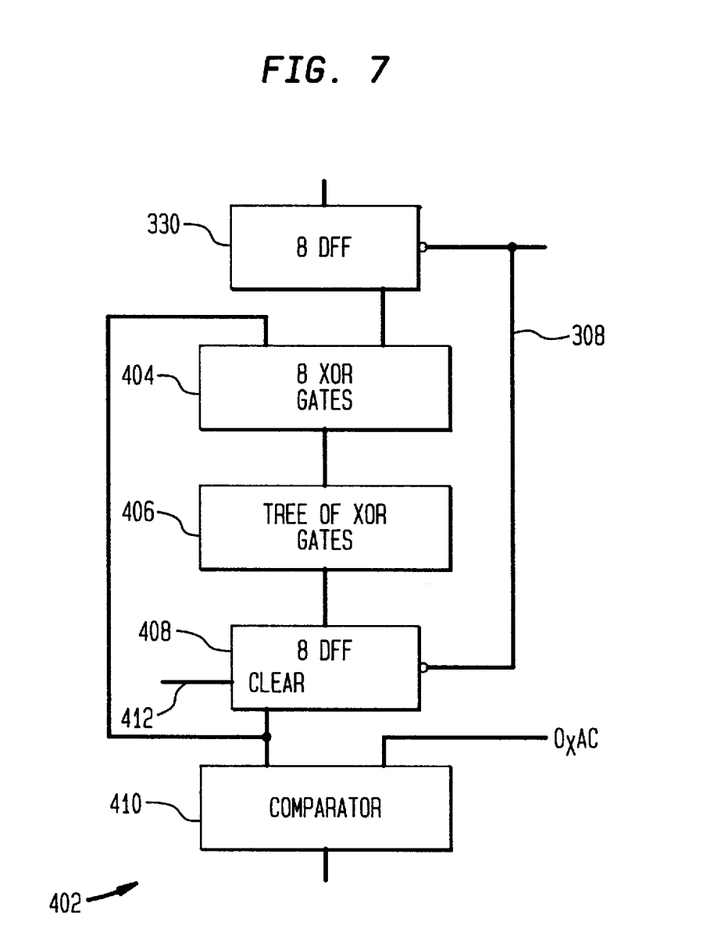
FIG. 7 is a block diagram of a circuit that determines whether an ATM header is valid.

FIG. 7 is a block diagram of a fast framing device 402 that determines whether a valid HEC has been discovered for a selected byte and ATM cell boundary. The register 330 inputs consecutive bytes such as bytes 134, 136, 138, 140 and 142 shown in FIG. 5 for each possible HEC determination. The fast framing device 402 assumes that a selected byte boundary is valid and proceeds to determine whether five consecutive bytes form a valid ATM header.

The fast framing device 402 shown in FIG. 7 includes a byte XOR gate 404 that XORs the byte contained in register 330 and a CRC byte contained in a register 408. The XOR gate 404 outputs the result of the XOR into the XOR tree 406 discussed earlier. The XOR tree 406 generates a CRC for the byte input from the XOR gate 404. The CRC generated by the XOR tree 406 is output to the register 408. The output of the register 408 is connected to the XOR gate 404 so that multiple byte CRC generation can be performed as discussed above. The output of the register 408 is also input into a comparator 410. The comparator 410 compares the CRC generated by the XOR tree 406 with the hexadecimal number "AC" 0×AC.

If the CRC output by the XOR tree 406 is equal to 0×AC, then the last five bytes input through the register 330 has good CRC and the selected byte and cell boundaries may be valid. This is true because the fifth byte of a valid ATM header is the HEC of the preceding 4 bytes. If the CRC generated for four consecutive bytes is XOR'd by the XOR gate 404 with the fifth byte, the result of the XOR would be 0×55 because the CRC of the first four bytes of a valid ATM header XOR'd with the HEC would cancel out the CRC contained in the HEC and result in a value of 0×55 that was XOR'd with the CRC to form the HEC, as discussed earlier. The CRC for 0×55 is 0×AC and if the output of the register 408 is 0×AC, the fifth byte may be a valid HEC for the preceding four bytes.

Using guess 130 shown in FIG. 5 as an example, the operation of the fast framing device 402 shown in FIG. 7 is discussed below. Initially, the register 408 is cleared by a signal on signal line 412 and the byte 134 is loaded into the register 330. The byte 134 is XOR'd by the XOR gate 404 with 0's output from the register 408. The output of the XOR gate 404 is input into the XOR tree 406 which generates a CRC and on a first byte clock from signal line 308, the CRC is loaded in register 408 and byte 136 is loaded into register 330.

After the first byte clock, the XOR gate 404 XORs byte 136 with the CRC in the register 408. The output of the XOR gate 404 is input into the XOR tree 406 which generates a second CRC. On a second byte clock from signal line 308, the second CRC is loaded into register 408 and byte 138 is loaded into register 330.

After the second byte clock, the XOR tree generates a third CRC and on the third byte clock, the third CRC is loaded into register 408 and byte 140 is loaded into register 330. This process continues until after the fifth byte clock when the register 408 contains the CRC for the potential header of guess 130.

The fast framing device 402 described above requires register 408 to be cleared before the CRC is generated for each possible header. For each selected ATM cell boundary, five consecutive bytes must be used to generate a CRC for a header. Thus, five bytes must be loaded through the barrel shifter 326 in order to generate a first CRC corresponding to a first ATM cell boundary guess. To generate a second CRC corresponding to the next five byte header of a second ATM cell boundary guess, the fast framing device 402 must be reinitialized because of its pipeline nature. For example, four of the five bytes used to determine the first CRC must be reloaded through the barrel shifter 326. Normally, the reinitialization process requires at least two byte clocks. Thus, the fast frame device 402 requires at least seven byte clocks to generate a CRC for each selected ATM cell boundary.

Figure 8:
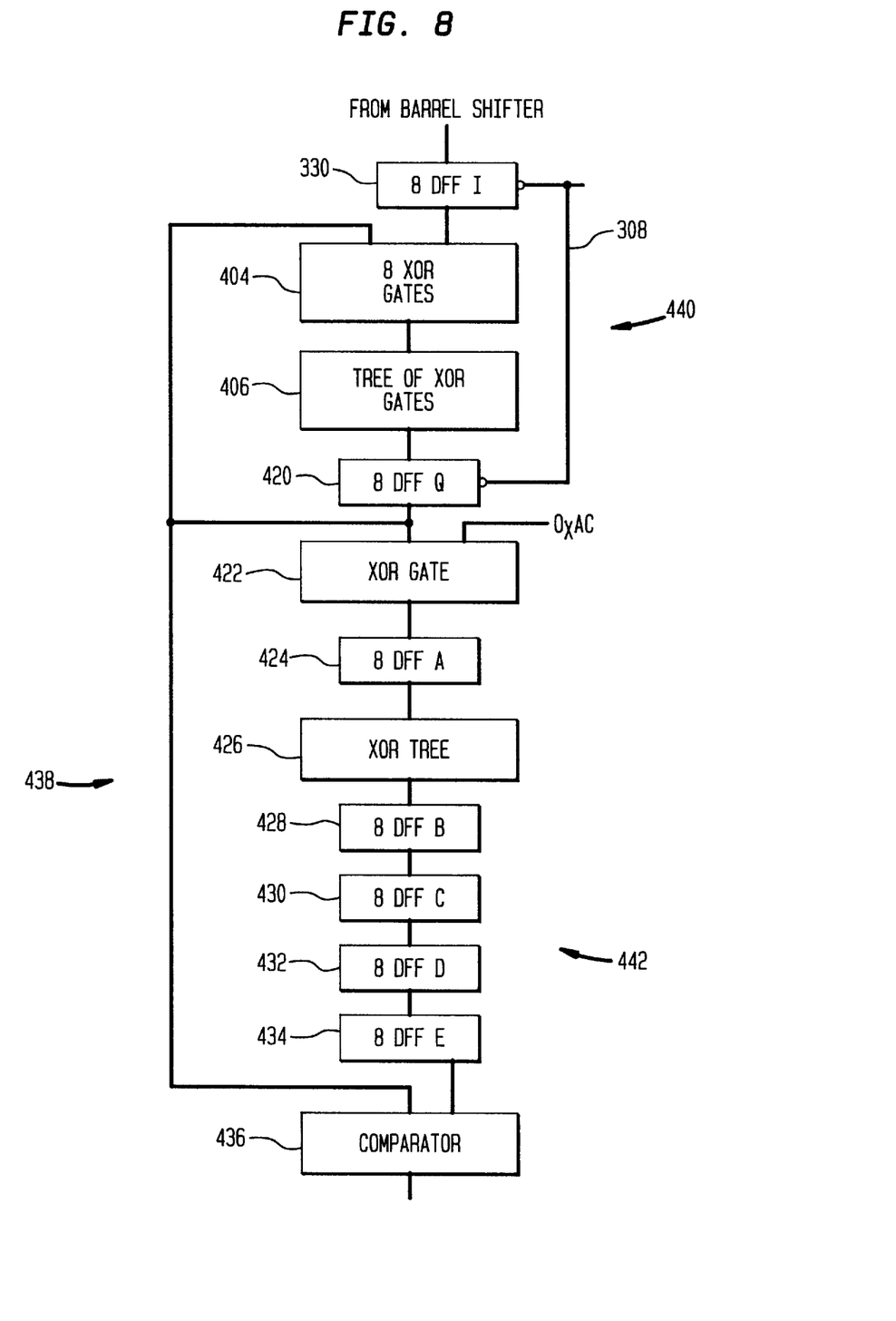
FIGS. 8 and 12 are block diagrams of a circuits that determine whether five consecutive bytes form a valid ATM header for every byte clock.

FIG. 8 is a block diagram of a fast framing device 438 that generates a compare result indicating whether five consecutive bytes of a selected ATM cell boundary has a valid ATM HEC for every byte clock. The fast framing device 438 has a CRC generator portion 440 and a result generator portion 442. The CRC generator portion 440 includes XOR gate 404 and XOR tree 406 as in the fast framing device 402. The XOR tree 406 generates a CRC for a byte input from the XOR gate 404 and outputs the CRC into a register 420 which is also part of the CRC generator portion 440. The register 420 is similar to the register 408 of the fast framing device 402, however, the register 420 is not initially reset for each HEC determination. The output of the register 420 is connected to the XOR gate 404, an XOR gate 422 and a comparator 436 of the result generator portion 442.

The result generator portion 442 include the XOR gate 422, registers 424 and 428–434, an XOR tree 426 and a comparator 436. The output of the register 420 is XOR'd with 0×AC by the XOR gate 422. The output of the XOR gate 422 is input into register 424. The output of register 424 is input into the XOR tree 426.

Figure 9:
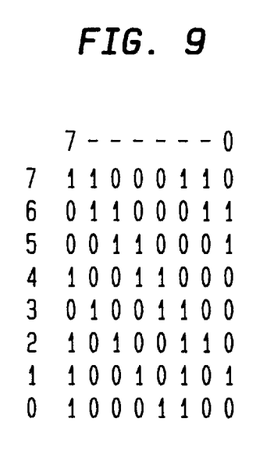
FIG. 9 is a table corresponding to looping a byte through a CRC generator for five iterations.
Figure 10:
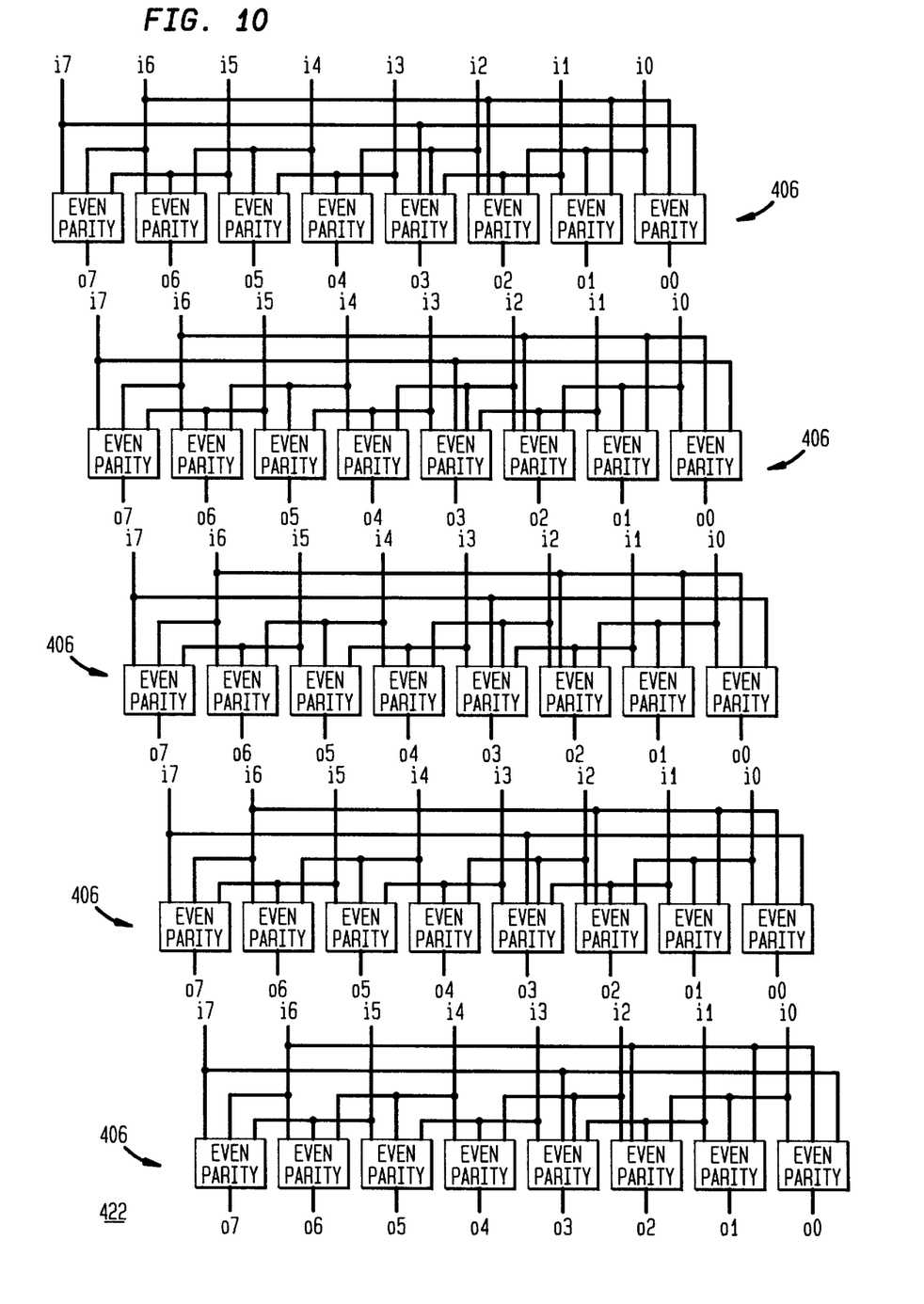
FIG. 10 is a block diagram of a tree of XOR gates implementing the table shown in FIG. 9.

The XOR tree 426 generates an output which has a value that is equivalent to applying the XOR tree 406 five times. FIG. 9 shows a table similar to the table shown in FIG. 3A. The table in FIG. 9 is generated by serially connecting five XOR trees 406 in series as shown in FIG. 10. By logic minimization, the serially connected XOR trees 406 is reduced to an equivalent table shown in FIG. 9. FIG. 9 indicates that output bit 7 of the XOR tree 426 is a 1 if the XOR of the input bits 7, 6, 3 and 1 of the XOR tree 426 is a 1. Output bit 6 of the XOR tree 426 is a 1 if the XOR of input bits 6, 5, 1 and 0 is a one, and so on for the other output bits of the XOR tree 426.

The output of the XOR tree 426 is delayed by four cycles through registers 428, 430, 432 and 434. The XOR gate 422, the XOR tree 426, the register 424 and the registers 428–434 form CRC predictor and predicts a CRC to be generated by the CRC generator portion 440 five byte clocks later. The output of the CRC predictor is compared with the output of register 420 by the comparator 436.

Figure 12:
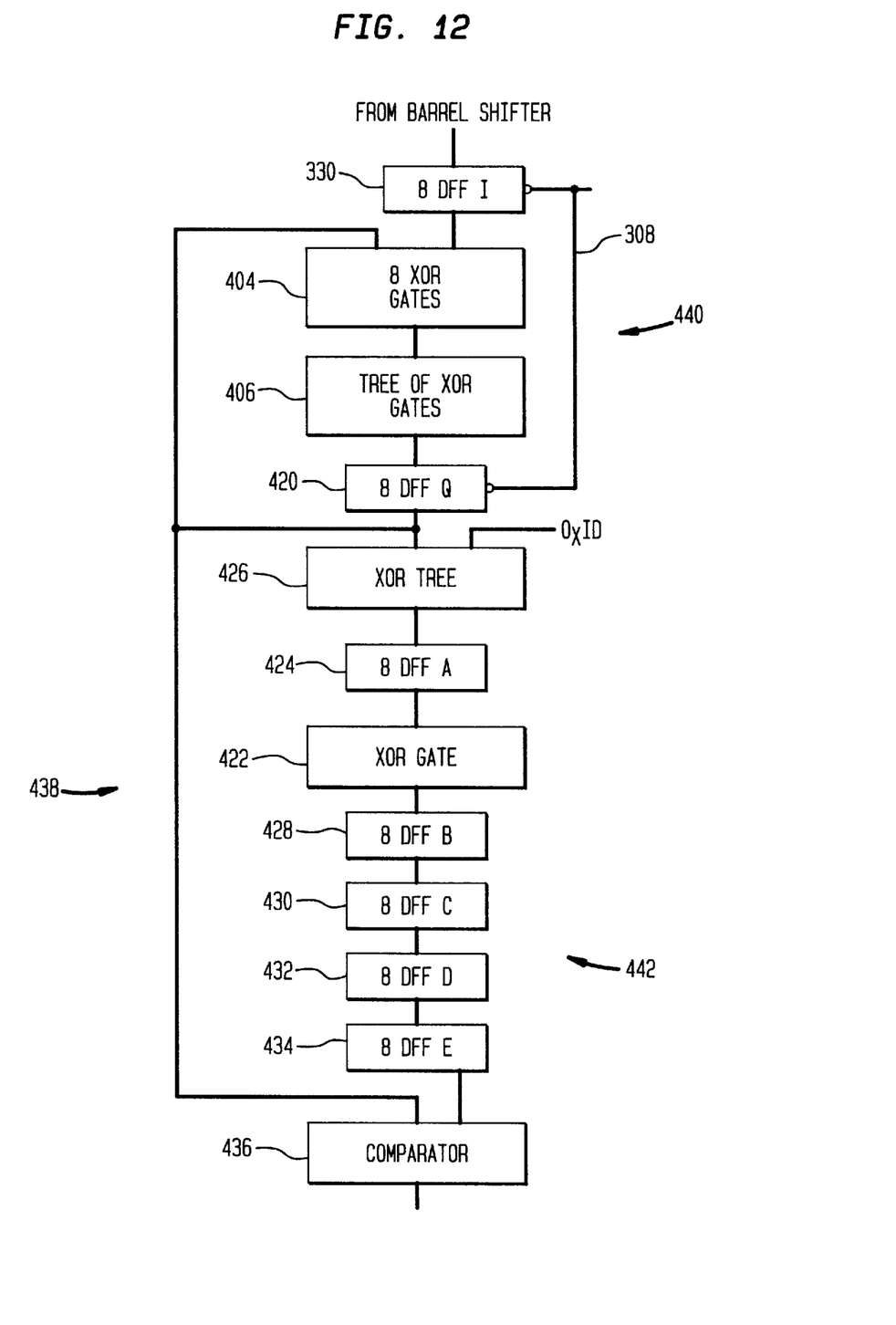

The positions of the XOR gate 422 and the XOR tree 426 may be interchanged as shown in FIG. 12. However, if interchanged, then the XOR gate 422 must XOR the hexadecimal number 0×1D instead of 0×AC because 0×AC must be processed by the XOR tree 426.

Figure 11:
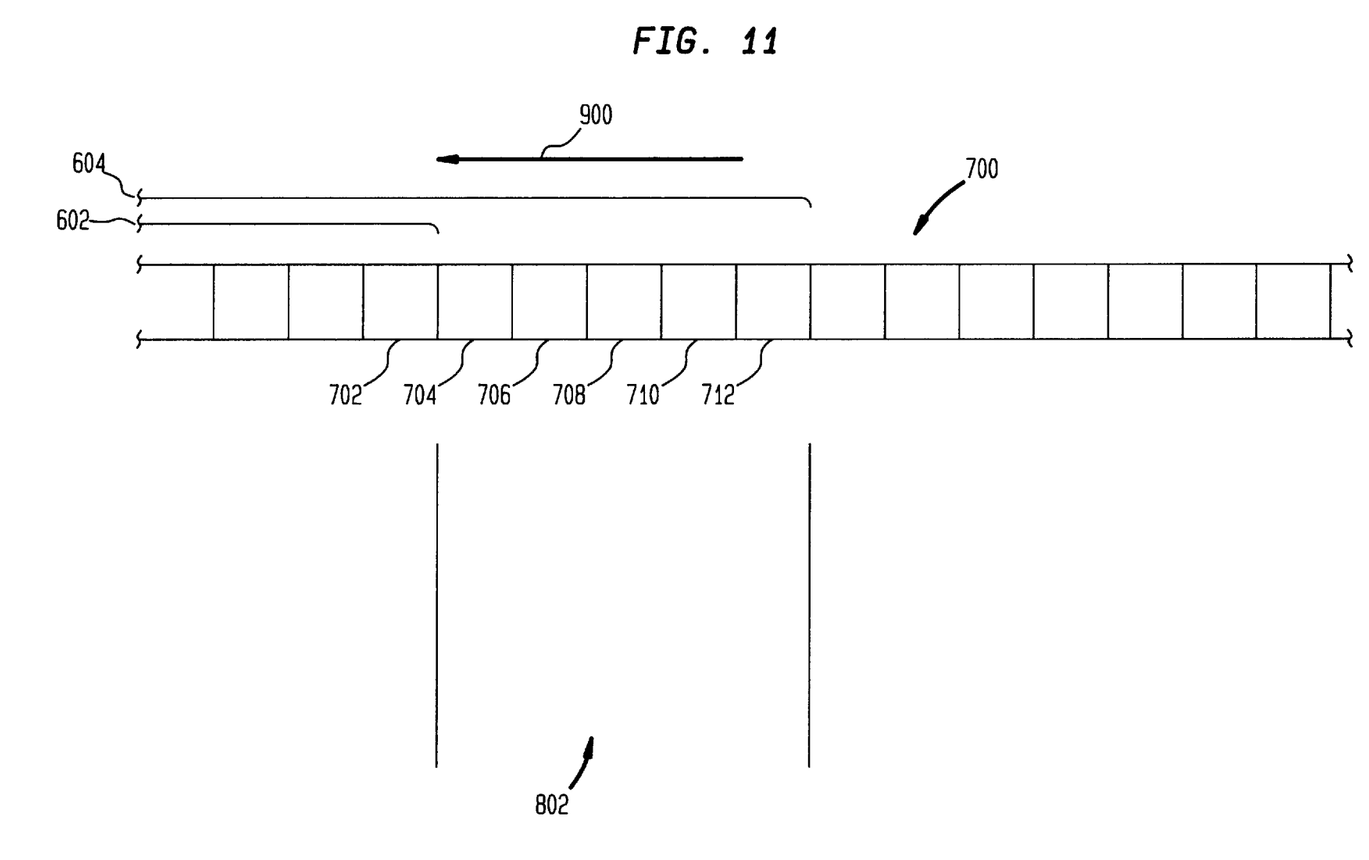
FIG. 11 is a diagram showing an ATM header processed by the circuit of FIG. 8.

The operation of the fast framing device 438 is explained in connection with FIG. 11. FIG. 11 shows a byte stream 700 and bytes 702–712. A five byte block 802 indicates a potential five byte header for an ATM cell having a boundary between byte 702 and 704. Because the register 420 of the fast framing device 438 is not reset, the CRC loaded into the register 420 is the CRC for all the bytes that have been loaded into the XOR gate 404 from the time when the fast framing device 438 was first turned ON. Thus, if the byte stream 700 is loaded into the XOR gate 404 in the direction indicated by arrow 900, then all the bytes up to byte 702 is included in the byte stream segment 602. Byte stream segment 604 includes all the bytes up to byte 712. The fast framing device 438 operates on the principle that the CRC for the byte stream segment 602 and the CRC for the byte stream segment 604 should match if the CRC for byte 602 is advanced through the XOR tree 406 for five byte clocks and if the header 802 is valid and XOR'd with 0×55.

The output of the register 420 is then XOR'd with 0×AC by XOR gate 422 which corresponds to the CRC of 0×55 that is XOR'd into the header by convention as discussed above. The output of the XOR gate 422 is loaded into register 424. The output of the register 424 is input into the XOR tree 426. The XOR tree 426 performs the function of five XOR tree's 406 connected in series. Thus, the output of the XOR tree 426 is equivalent to advancing the output of the register 420 through XOR tree 406 for five byte clocks. Registers 424 and 428–434 delays the output of the XOR tree 422 by five byte clocks.

Thus, if the CRC corresponding to the byte stream segment 602 was input into the XOR gate 422, then the output of register 434 is time matched with this CRC corresponding to the byte stream segment 604. If header 802 is a valid ATM header, then the output of register 434 should match the output of register 420 and the comparator 436 should indicate a positive compare result. Because register 420 is not reset, the fast framing device 438, shown in FIG. 8, generates an output for every byte clock to indicate whether a next block of five bytes contains a valid HEC for a potential ATM cell. This is much faster than the 7 byte clock cycles required by the fast framing device 402.

Eight of the fast framing devices 438 may be used to generate a valid HEC signal for every byte boundary of every byte. Thus, combining eight fast framing devices 438 together, valid ATM cells may be determined for every byte and ATM cell boundaries on the fly without any delay. However, other considerations such as costs and size may limit the number of fast framing devices 438 that may be practically applied.

An alternative framing device would be to provide eight parallel XOR trees where each XOR tree directly generates a result for a compare. Each XOR tree would input five consecutive bytes for one byte boundary. Each XOR tree would have about 20 inputs on the average and the framing device would have about 100 XOR gates. However, the fast framing device 438 would be preferred over this alternative framing device.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A fast framing device, comprising:

an input terminal inputting a sequence of bytes of data;

a cyclical redundancy code generator coupled to the input terminal; and a result generator coupled with the cyclical redundancy code generator, the result generator generating a result every byte clock based on a cyclical redundancy code generated by the cyclical redundancy code generator and a predicted cyclical redundancy code generated by a first XOR tree and a first XOR gate for XORing with a predetermined number having a hexadecimal value of 0×AC or 0×1D, wherein the result indicates whether the sequence of bytes satisfies a predetermined framing condition.

2. The fast framing device of claim 1, wherein the result generator comprises:

a cyclical redundancy code predictor; and a comparator coupled to the cyclical redundancy code predictor and the cyclical redundancy code generator, the comparator comparing a cyclical redundancy code generated by the cyclical redundancy code generator and the predicted cyclical redundancy code generated by the cyclical redundancy code predictor to output the result every byte clock.

3. The fast framing device of claim 2, wherein the cyclical redundancy code predictor comprises:

the first XOR tree;

the first XOR gate coupled with the first XOR tree; and at least one register coupled with the first XOR tree and the first XOR gate, wherein the first XOR tree and the first XOR gate generate the predicted cyclical redundancy code, and the at least one register delays the predicted cyclical redundancy code by a preset number of byte clocks.

4. The fast framing device of claim 3, wherein the first XOR tree receives the cyclical redundancy code generated by the cyclical redundancy code generator and generates an output equivalent to looping the cyclical redundancy code through the cyclical redundancy code generator for the preset number of byte clocks.

5. The fast framing device of claim 3, wherein the first XOR gate XORs an output of the first XOR tree or the cyclical redundancy code generator with a predetermined number.

6. The fast framing device of claim 5, wherein the predetermined number has the hexadecimal value of 0×AC.

7. The fast framing device of claim 3, wherein the at least one register comprises a number of registers equal to the preset number.

8. The fast framing device of claim 1, wherein the cyclical redundancy code generator comprises:

a second XOR gate;

a second XOR tree coupled to the second XOR gate; and a register coupled to the second XOR tree, wherein the second XOR gate XORs an output of the register with the sequence of bytes input from the input terminal.

9. The fast framing device of claim 8, wherein the second XOR tree generates a cyclical redundancy code corresponding to the output of the second XOR gate, the register loading the cyclical redundancy code generated by the second XOR tree every byte clock.

10. The fast framing device of claim 8, wherein the register is not cleared while the fast framing device is operational.

11. The fast framing device of claim 1, wherein the sequence of bytes is a byte stream of an Asynchronous Transfer mode transmission.

12. The fast framing device of claim 1, wherein the predetermined framing condition is that the sequence of bytes is a valid Asynchronous Transfer mode header.

13. A method for fast framing a sequence of bytes of data, comprising:

inputting the sequence of bytes of data through an input terminal;

generating a cyclical redundancy code; and generating a result based on the cyclical redundancy code and a predicted cyclical redundancy code generated using a predetermined number having a hexadecimal value of 0×AC or 0×1D, wherein the result indicates whether the sequence of bytes satisfies a predetermined framing condition.

14. The method of claim 13, wherein the generating a result step comprises:

generating a predicted cyclical redundancy code;

delaying the predicted cyclical redundancy code for a preset number of byte clocks;

comparing the predicted cyclical redundancy code with the cyclical redundancy code; and outputting the result based on the comparing step.

15. The method of claim 14, wherein the generating a predicted cyclical redundancy code step comprises:

inputting a byte of data;

generating an output equivalent to looping the byte of data through the generating a redundancy code step for the preset number of byte clocks.

16. The method of claim 13, wherein the generating the cyclical redundancy code step comprises:

XORing the sequence of bytes of data input through the input terminal with an output of a register;

generating the cyclical redundancy code using an XOR tree; and loading the generated cyclical redundancy code in the register every byte clock.

* * * * *